INVENTOR
OSCAR B. NOREN

ATTORNEYS

INVENTOR
OSCAR B. NOREN

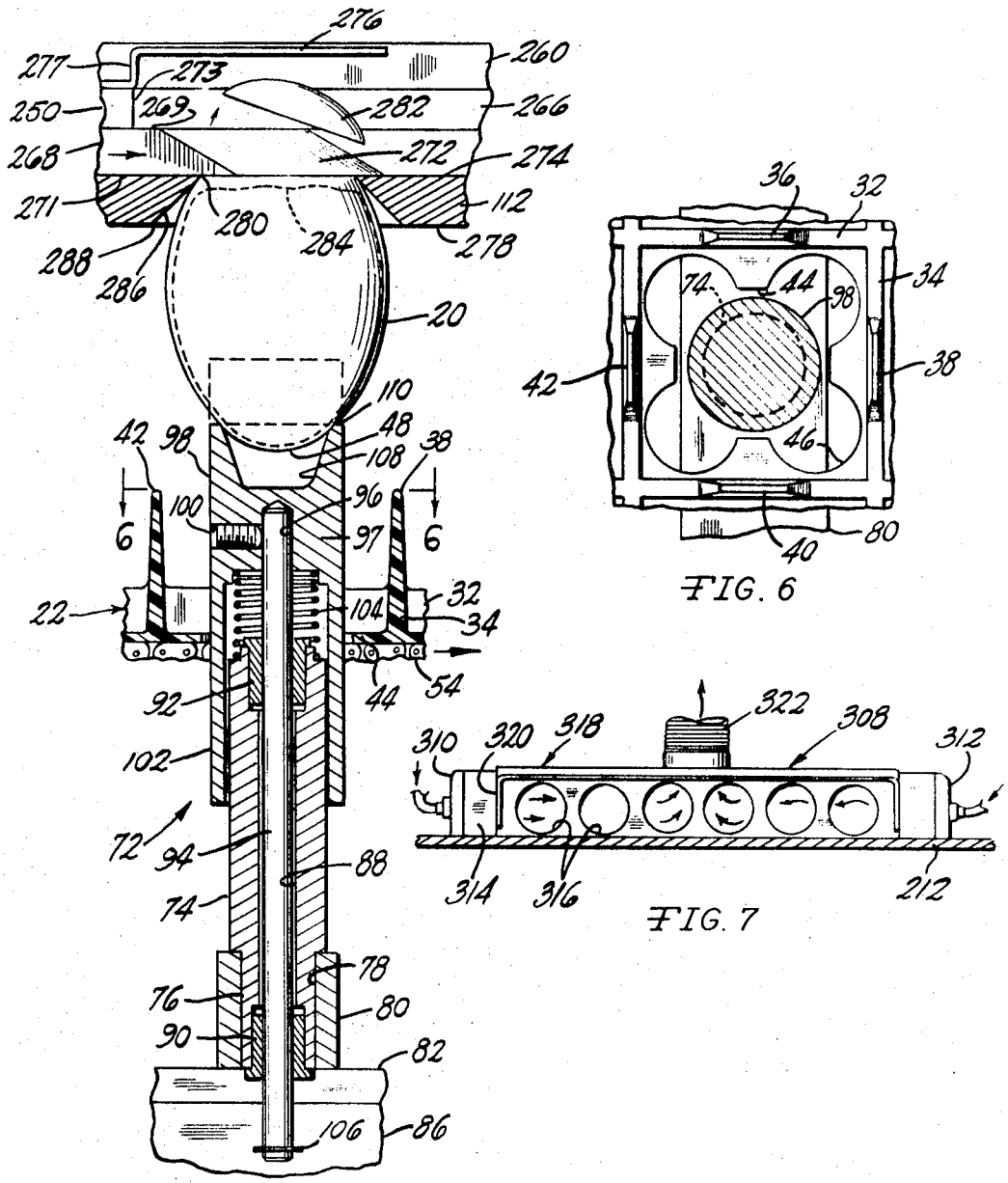

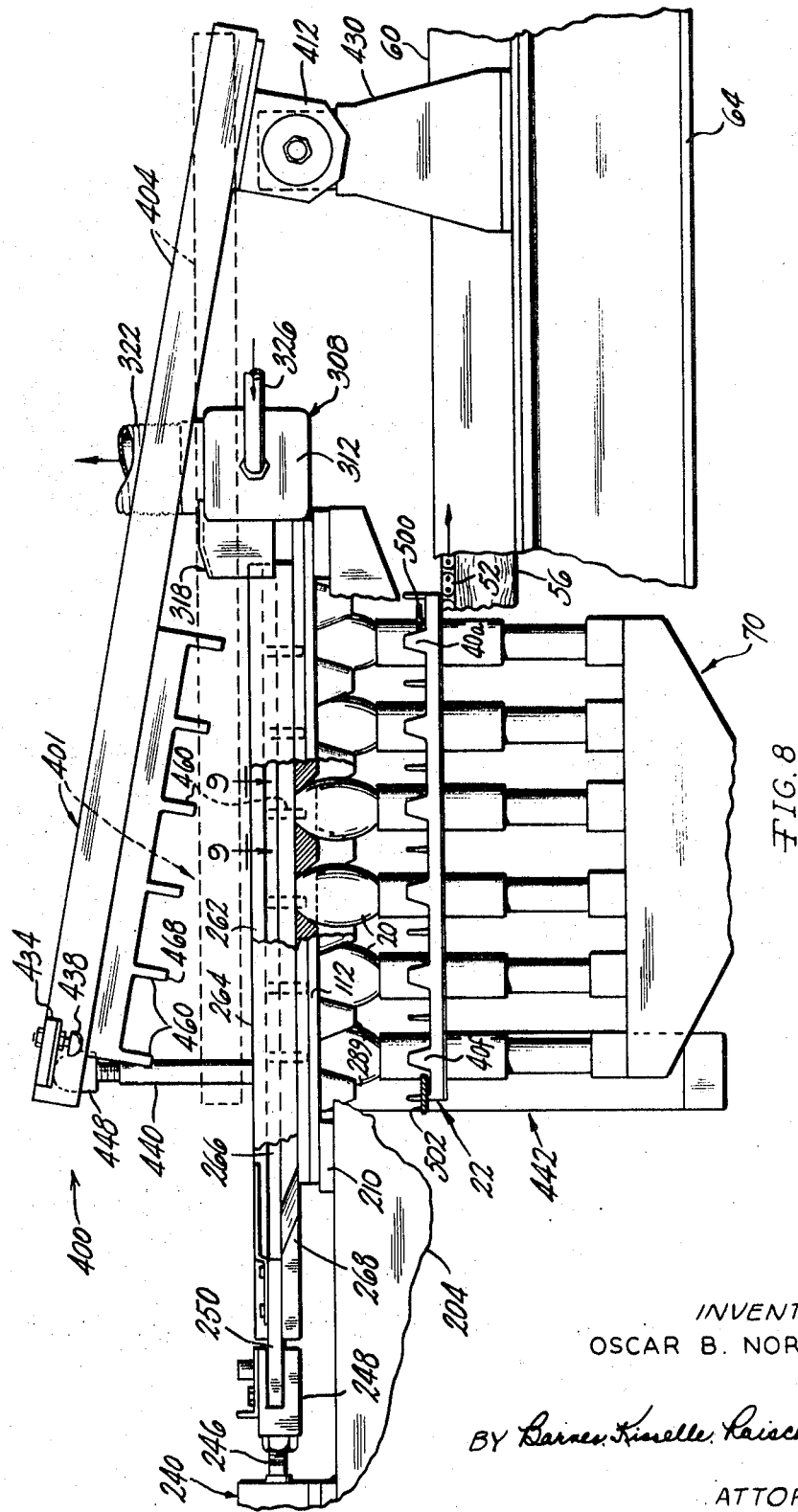

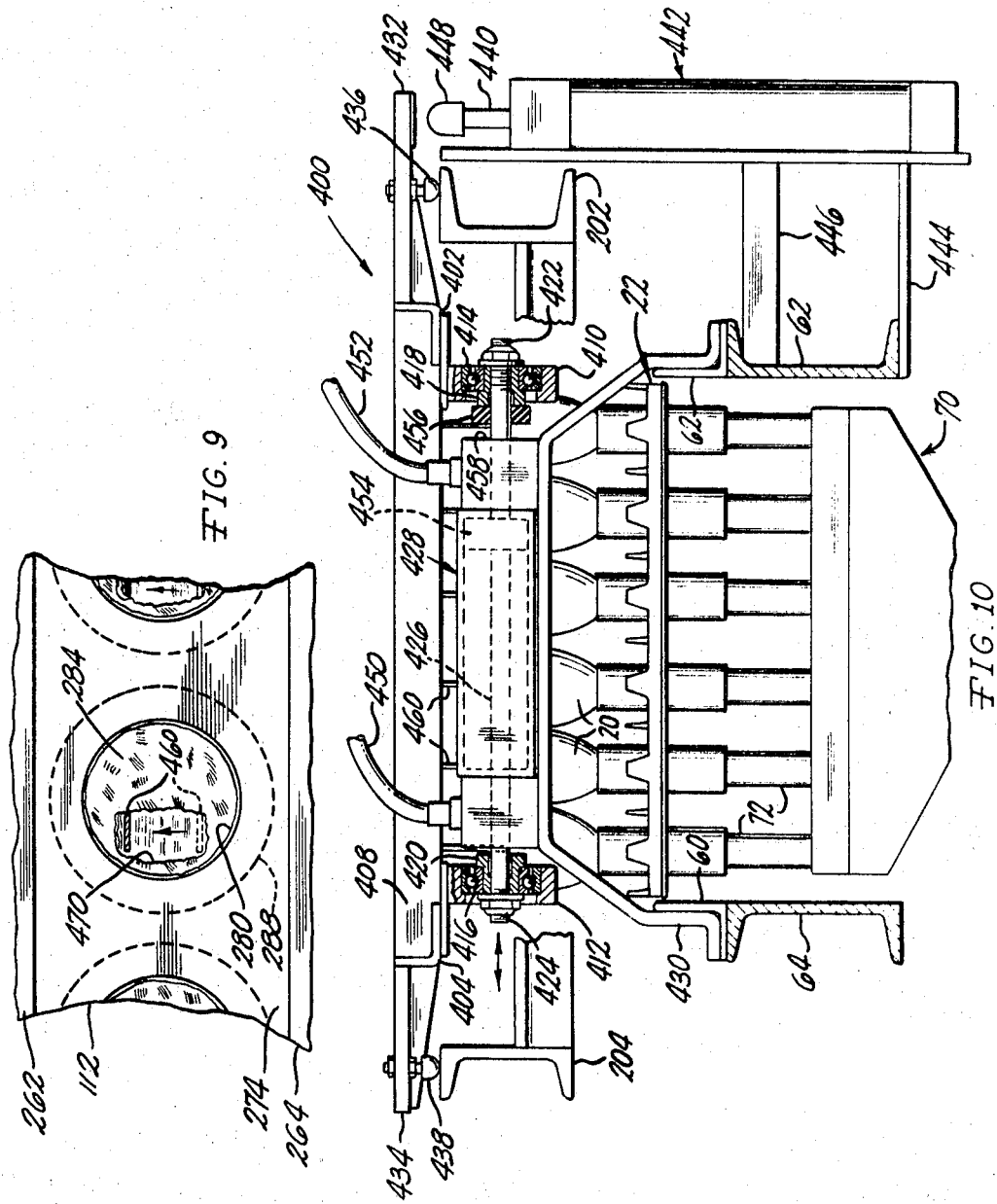

Oct. 7, 1969   O. B. NOREN   3,470,925
MACHINE FOR OPENING EGGS TO PERMIT REMOVAL
OF VIRAL PRODUCTS THEREFROM
Filed Dec. 29, 1966   8 Sheets-Sheet

INVENTOR
OSCAR B. NOREN

BY Barnes, Kisselle, Raisch & Choate

ATTORNEYS

United States Patent Office 3,470,925
Patented Oct. 7, 1969

3,470,925
MACHINE FOR OPENING EGGS TO PERMIT REMOVAL OF VIRAL PRODUCTS THEREFROM
Oscar B. Noren, Grosse Pointe Farms, Mich., assignor to Parke, Davis & Company, Detroit, Mich., a corporation of Michigan
Filed Dec. 29, 1966, Ser. No. 605,888
Int. Cl. A47j *43/14;* A23b *5/00*
U.S. Cl. 146—2                                                16 Claims

ABSTRACT OF THE DISCLOSURE

A machine for decapping eggs to open the same for removal of the liquid therein. The machine transports, locates and fixtures a plurality of eggs while on an egg tray. The machine then lifts the eggs individually into locating apertures where the protruding upper ends of the eggs are sliced off by a decapping knife.

A membrane tearing mechanism punctures the allantoic membrane of the egg exposed by decapitation of the egg. The decapping knife has a debris catcher which cooperates with the rapid cutting stroke velocity of the knife and with a receptacle and vacuum removal system for carrying off the removed portion of the egg shell resulting from the decapping operation.

---

This invention relates to the manufacture of biologicals and more particularly to a machine for opening eggs in which a virus has been propagated in the white of the egg to permit removal of the virus bearing liquid from the egg for subsequent processing into vaccine or other viral products.

Influenza virus vaccine production has hitherto been performed manually under government standards which specify incubation of chicken eggs for eleven days, candling inspection of the eggs after the eleven-day incubation, inoculation of the egg with influenza seed virus, incubation for another two days to propagate the virus within the egg, candling inspection of the inoculated eggs, an overnight chill followed by cutting open the eggs, and then withdrawing the infected liquid from the egg for centrifuging and further processing into influenza vaccine.

An object of the present invention is to provide economical, high speed apparatus for mechanizing and automating the hitherto manual procedure of opening the infected eggs and preparing them for subsequent withdrawal of the liquid-entrained viral products to thereby increase production capacity and reduce the cost of vaccine production.

Other objects, features and advantages of the present invention will become apparent from the following detailed description taken in conjunction with the accompanying drawings wherein:

FIG. 5 is a fragmentary vertical section on the line 5—5 of FIG. 3 illustrating an individual egg lifter in its raised position supporting an egg as it is being decapitated by a knife of the cutting mechanism.

FIG. 6 is a fragmentary horizontal section on the line 6—6 of FIG. 5.

FIG. 7 is a fragmentary vertical section on the line 7—7 of FIG. 2.

FIG. 8 is a fragmentary side elevational view similar to that of FIG. 4 but also showing the membrane tearing mechanism of the machine, portions being broken away to better illustrate details.

FIG. 9 is a fragmentary horizontal section on the line 9—9 of FIG. 8.

FIG. 10 is a fragmentary end elevational view of the membrane tearing mechanism, looking at the right hand end of the mechanism as viewed in FIG. 8.

Figure 3:
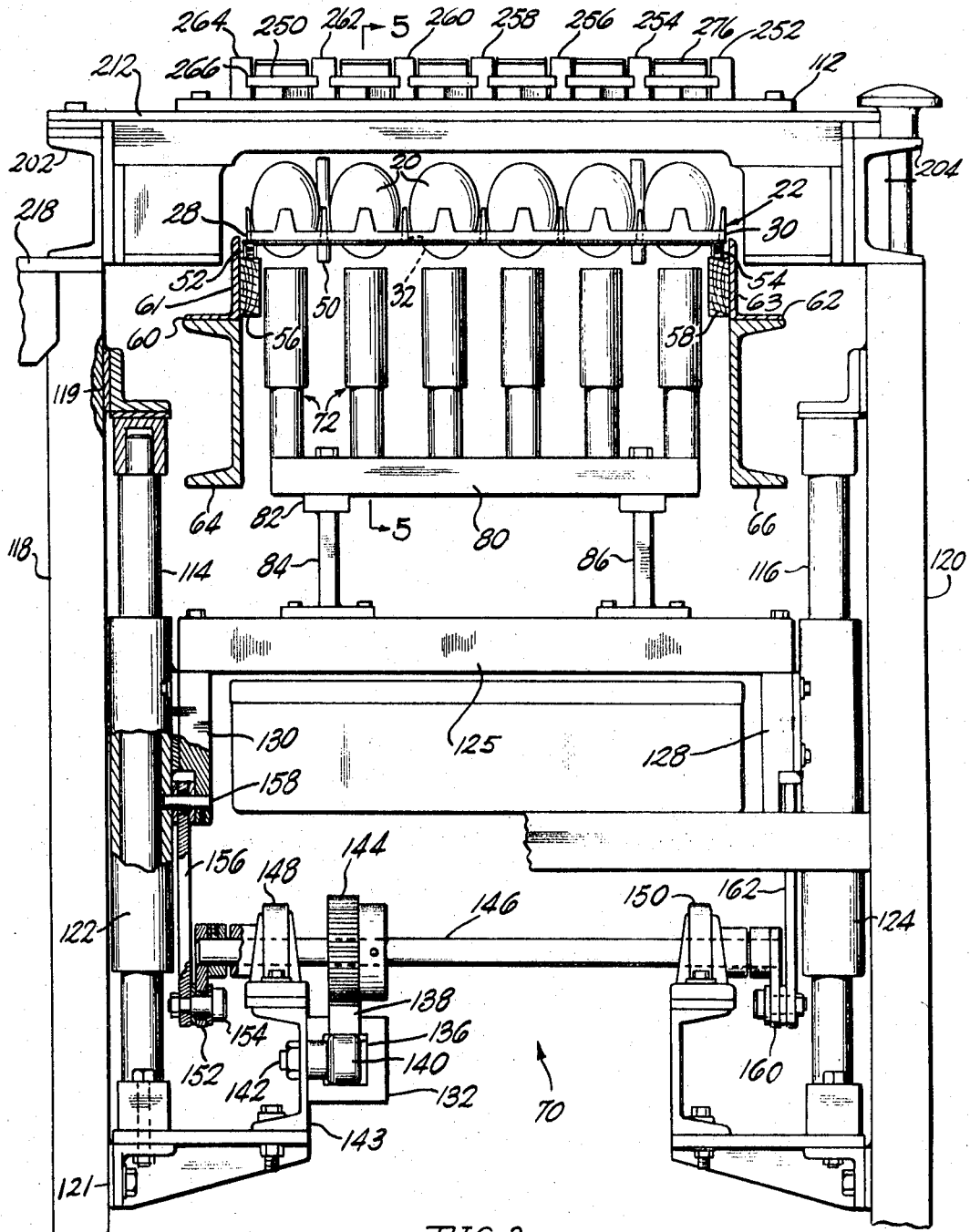
FIGS. 3 and 4 are fragmentary end and side elevational views respectively of the egg elevator mechanism of the machine, portions being broken away to better illustrate details.
Figure 4:
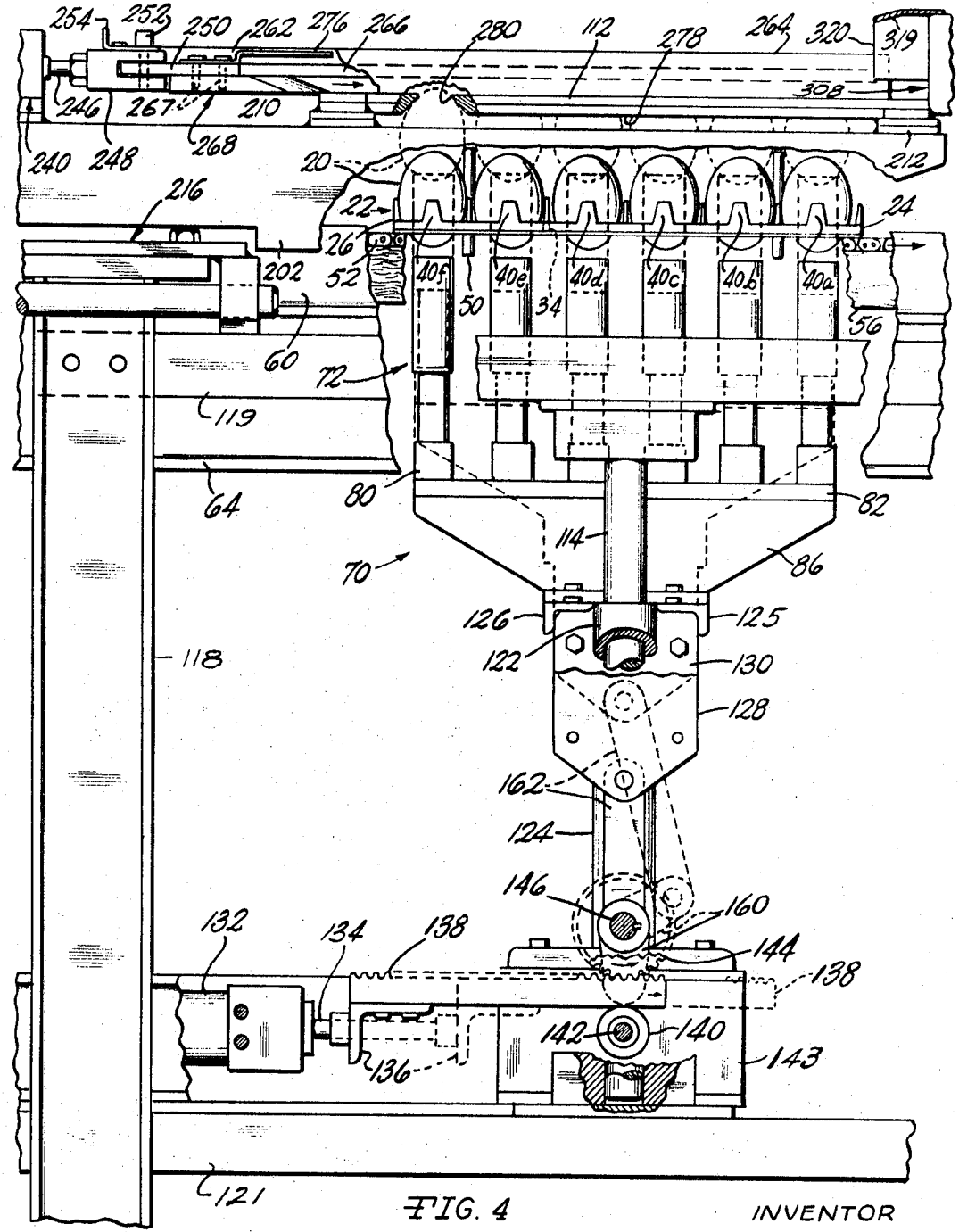

The preferred embodiment of a machine of the present invention as illustrated by way of example herein is operable to transport, locate and fixture a plurality of hens' eggs 20 or the like while the same are arranged in a predetermined fashion on an egg flat or tray 22 (FIGS. 3 and 4). The machine then simultaneously lifts all of the eggs out of the tray and into a cutting mechanism while the tray remains stationary, slices off the upper ends of the eggs and removes the severed debris, pierces the upper end of the allantoic membrane of each semi-developed embryo exposed by decapitation of the eggs, then lowers the opened eggs back onto the tray for transport thereon out of the machine to a harvesting station for removal from the eggs of the allantoic liquid in which the virus has been grown, all of these steps being performed without any manual handling of the eggs.

Egg tray

Although the means for supporting the eggs may take various forms, a commercially available plastic tray 22 made by James Manufacturing Company of Fort Atkinson, Wis., is preferred and is illustrated herein. Tray 22 is square shaped in plan configuration and is adapted to support up to thirty-six chicken eggs 20 arranged upright in six parallel rows with six eggs in each row. As best seen in FIGS. 3–6, tray 22 has parallel front and rear walls 24 and 26 (FIG. 4), parallel side walls 28 and 30 (FIG. 3), five lengthwise partitions 32 parallel to the side walls and five transverse partitions 34 (FIG. 4) parallel to the end walls, thereby subdividing tray 22 into thirty-six equal size square compartments, one of which is shown in FIGS. 5 and 6. Each compartment is also bounded by four fingers 36, 38, 40 and 42 (FIGS. 5 and 6) which extend upright from the boundary walls of the compartment at 90 degree intervals around the center of the compartment to form lateral supports for maintaining an egg upright in each compartment. Each compartment is completely open at the top and partially open at the bottom. The bottom wall of each compartment comprises four tabs 44 extending horizontally inwardly one from the lower edge of each of the compartment side walls, the space between each adjacent pair of tabs being cut away in a circular configuration as at 46 (FIG. 6). Tabs 44 engage the side of an egg 20 so as to support the same with the pointed or narrow end 48 thereof projecting beneath tray 22 as best seen in FIG. 3 and 4. Tray 22 is provided with four vertical posts 50 (FIGS. 3 and 4), one at the inner corner of each corner compartment, which extend above and below the eggs to permit the trays to be stacked one on top of another or placed on a flat surface with a clearance for the eggs. The six fingers 40a, 40b, 40c, 40d, 40e and 40f (FIG. 4) along each side edge of tray 22 are equally spaced from one another and each of these fingers bears the same orientation relative to its adjacent egg compartment.

Conveyor mechanism

Referring to FIGS. 1, 3, 4 and 5, the machine of the invention includes a conveyor mechanism for supporting and transporting tray 22 loaded with eggs along a horizontal path through the machine. The tray is caught and held stationary at a work station in this path by a tray positioning mechanism described subsequently herein. The conveyor includes a pair of endless roller chains driven continuously by a suitable drive mechanism (not shown), the chains being suitably trained around sprockets such that a run 52 of one chain and a run 54 of the other chain both travel horizontally in spaced parallel relation along the upper surfaces of rails 56 and 58 respectively. Rails 56 and 58 are respectively fixed to angle iron guides 60 and 62 which in turn are respectively mounted on spaced horizontally extending channels 64 and 66 of the conveyor framework (not otherwise shown). The upright flanges 61 and 63 of guides 60 and 62 project above rails 56 and 58 and runs 52 and 54 to form parallel side guides for the runs, and closely slidably receive the side edges of tray 22 therebetween to guide movement of the tray. Tray 22 rests loosely along the side edges of its bottom surface on runs 52 and 54 (FIG. 3) which frictionally propel the tray in the direction of the arrow in FIGS. 1, 4, 5 and 8.

Egg elevator mechanism

Referring to FIGS. 3, 4 and 5, the egg elevating mechanism 70 of the machine is located beneath the conveyor at the work station of the machine and includes a set of thirty-six telescopic plungers 72 arranged in an upright array for individual registry with the thirty-six egg compartments of tray 22 when the same is stationarily fixtured as described hereinafter at the work station of the machine.

As best seen in FIG. 5, each plunger 72 comprise a cylindrical post 74 having a reduced diameter stem 76 at its lower end removably inserted in a hole 78 of a horizontal bar 80. Each of the six bars 80 support six plungers 72 in a transverse row and is mounted on the upper flanges 82 of a pair of spaced I-beams 84 and 86 (FIG. 3). Post 74 has an axial thoroughbore 88 with counterbores at the opposite ends thereof in which bushings 90 and 92 are respectively secured for slidably supporting a coaxial shaft 94, the ends of which project beyond the bushings. The upper end of shaft 94 is inserted into an axial blind bore 96 in a transverse wall 97 of a lifter 98 to thereby telescopically support the same on post 74. Lifter 98 is adjustably secured to shaft 94 by a set screw 100 and has a cylindrical skirt 102 which telescopes over the upper end of post 74 with a clearance fit. A compression coil spring 104 encircles shaft 94 within skirt 102 and abuts at its ends against post 74 and lifter 98 respectively to bias the lifter upwardly to its fully extended position (broken lines in FIG. 5) wherein a snap ring 106 secured to the lower end of shaft 94 abuts bushing 90. The upper annular end face 110 of lifter 98 rims a frusto-conical recess 108 for receiving the small end of an egg 20 therein, the upper end of lifter 98 thus providing a cup-shaped support adapted to receive an egg seated thereon with its axis vertical and its large end up. The outside diameter of lifter 98 is less than the distance between diametrically opposed tabs 44 so that each lifter 98 can pass axially through the open bottom of the associated tray compartment, after it has engaged the lower end of the egg resting therein, to lift the egg out of the compartment and into yieldable engagement with an aperture in a locating plate 112, as described in more detail subsequently herein.

Elevator mechanism 70 also includes a plunger carriage (FIGS. 3 and 4) which reciprocates vertically on a pair of horizontally spaced upright guide posts 114 and 116 rigidly secured at their ends to stringers 119 and 121 which extend respectively between adjacent legs 118 and 120 of the framework of the machine on the same side of the machine. The carriage includes sleeves 122 and 124 which slide respectively on guides 114 and 116 and support cross table therebetween which is made up of a pair of angle irons 125 and 126 secured at their ends to vertical plate assemblies 128 and 130 which in turn are welded to sleeves 124 and 122 respectively. Rails 84 and 86 are bolted crosswise to table rails 125 and 126.

The carriage is raised and lowered by a drive mechanism which may be a vertically arranged pneumatic or hydraulic ram, but preferably comprises an air motor or air cylinder which drives the carriage via a bell crank linkage to thereby impart harmonic motion to the vertical travel of the carriage. The drive illustrated herein comprises a conventional air cylinder 132 rigidly secured to the framework of the machine and disposed with its piston rod 134 extending horizontally. An angle bracket 136 (FIG. 4) is carried on the free end of rod 134 and in turn supports one end of a rack 138. The free end of rack 138 is supported on a roller 140 which is journaled by a bearing on an axle 142 mounted on a channel 143 of the machine framework. Air cylinder 132 is operable to reciprocate rack 138 horizontally between the solid and broken line positions thereof as shown in FIG. 4 under the control of a valved air supply system described in more detail subsequently herein. The teeth of rack 138 mesh with a pinion 144 fixed to a shaft 146 journaled for rotation in a pair of spaced bearing supports 148 and 150 supported on the machine framework. A pair of crank arms 152 and 160 are secured one to each end of shaft 146, arm 152 being pivotally connected at its other end by a pin 154 to the lower end of a connecting rod 156 which in turn has its upper end pivotally connected to plate 130 by a pin 158. Crank arm 160 and a connecting rod 162 are articulately connected between the other end of shaft 146 and plate 128 in like manner.

When rack 138 is driven by air cylinder 132 from the solid to the broken line positions thereof, gear 144 is rotated counterclockwise as viewed in FIG. 4 to thereby rotate shaft 146 through 180 degrees. Although gear 144 is shown in FIG. 4 as being rotated through 120 degrees by travel of rack 138 through its stroke, it is preferred to produce 180 degrees of rotation of gear 144 in a complete stroke of rack 138. This swings cranks 156, 160 counterclockwise from the bottom dead center position thereof shown in solid lines in FIG. 4 to a top dead center position to thereby lift the carriage from the bottom to the top of its vertical stroke, i.e., to its position as shown in broken lines in FIG. 4. The vertical ascent of the carriage thus follows a harmonic motion wherein the carriage reaches maximum velocity near midstroke and then decelerates to top dead center. During the latter portion of carriage ascent, plungers 72 engage the bottom ends 48 of eggs 20 and lift the same out of their respective egg compartments of tray 22 and into individual registry with vertically aligned apertures 280 in plate 112. Plungers 72 are designed for the particular size of eggs being processed, such as "large" size eggs, so that all of the eggs contact plate 112 before the carriage has reached its uppermost position, the average point of engagement being preferably when the carriage is within about ½ inch of its uppermost position. Prior to the eggs contacting plate 112 plungers 72 are biased to their fully extended length by springs 104. However, once upward motion of each egg 20 is arrested by contact thereof with plate 112, lifter 98 thereafter remains stationary while post 74 continues moving upwardly with the carriage, post 74 thus telescoping within skirt 102 and compressing spring 104. This resilient lost motion connection between the lifter and post of plunger 72 causes eggs 20 to firmly yet yieldably engage plate 112, thereby preventing breakage of the eggs and insuring that they are securely clamped against the plate even though the longitudinal dimension of the eggs may vary substantially within any given lot on tray 22.

During the initial descent of the plunger carriage in the retraction stroke of the egg elevating mechanism, lifter 98 remains stationary until post 74 has dropped sufficiently to recover the lost motion and thereafter lifter 98 travels downwardly with post 74, thus lowering the eggs out of engagement with plate 112 and returning them to their upright seated positions in the egg compartments of tray 22. When the carriage drive mechanism is returned to its fully lowered position, the upper ends of plungers 72 drop clear of the eggs in the rack as shown in FIG. 3. Tray 22 is then free to be frictionally propelled out of the work station by the conveyor chains without interference from the elevating mechanism.

Cutting mechanism

The cutting mechanism 200 of the machine (FIGS. 1 and 2) is mounted on a framework comprising a pair of longitudinal channels 202 and 204 connected by four cross braces 206, 208, 210 and 212. This framework is pivotally supported along channel 202 by a pair of hinges 214 and 216 mounted on platforms 218 of the machine framework, and a handle 220 is attached to channel 204 to facilitate swinging the cutting mechanism framework from its horizontal operative position (FIG. 2) to its upright inoperative position (FIG. 1) wherein the underside of the mechanism is exposed, as is the upper end of the elevator mechanism 70, to facilitate set-up and clean-up operations. A pair of threaded locating pins 222 and 224, operated by knobs 223 and 225 respectively (FIG. 2), are mounted on channel 204, pin 222 being screwed into a hole 226 of a platform 228 (FIG. 1), and pin 224 into a like platform (not shown), to thereby accurately position and lock cutting mechanism 200 in its horizontal operative position.

Mechanism 200 includes a parallel, horizontally extending array of six identical pneumatically driven cutter units 230, 232, 234, 236, 238 and 240, one for decapitating each lengthwise row of six eggs supported by elevator mechanism 70. Cutter unit 230 comprises a conventional air cylinder 242 of the double acting type containing a piston 244 which drives a plunger 246. A clevis 248 is mounted on the projecting end of plunger 246 and is detachably connected to a rectangular guide plate 250 of a knife assembly by a pin 252 which extends through registering apertures in the clevis and plate and which is locked by a conventional slide finger locking member 254.

Figure 2:
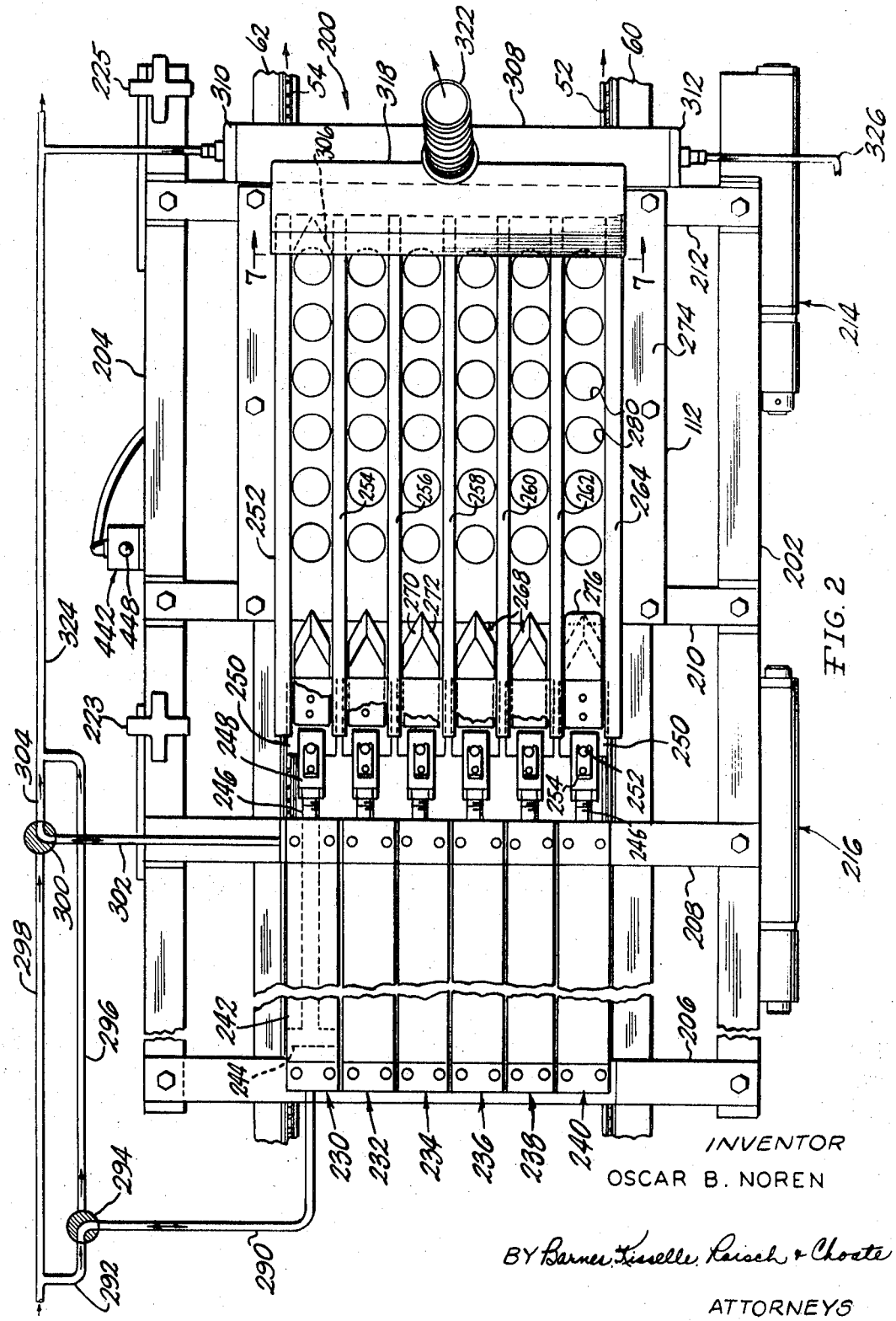
FIG. 2 is a fragmentary top plan view of the cutting mechanism of the machine disposed in its horizontal operative position on the bed of the machine, with a portion of of the associated pneumatic operating system shown semischematically.

Cutter mechanism 200 has seven parallel guide bars 252, 254, 256, 258, 260, 262 and 264 mounted in equally spaced relation on the upper surface 274 of plate 112. A pair of these guide bars flank the path of travel of each plate 250, as best seen in FIGS. 2 and 3, and two grooves 266, one formed in each side of the adjacent pair of bars, slidably receive the side edges of the intervening plate 250 to thereby support and guide travel of the free end of plunger 246. A knife 268 is detachably secured one to each plate 250 by screws 267 (FIG. 4), and has two cutting faces 270 and 272 (FIG. 2) which are inclined upwardly and rearwardly from the flat underside 271 of the knife and which converge toward one another to a point located centrally of the knife body. The blade of the knife thus resembles a "cow-catcher" in configuration, the top surface 269 of the knife also being flat and parallel to surface 271. Knife 268 is preferably supported by plate 250 and the associated guide bars so that surface 271 is spaced above surface 274 of plate 112 by about .001 inch. Each knife assembly also has an S-shaped deflector plate 276 detachably secured to guide 250 by screws 267 and extending horizontally above the cutting edges of knife 268 and fitting closely between the associated guide bars so as to form with knife surface 269 a scoop for catching the severed fragments of the egg as the knife slices across the top of the egg, as illustrated in FIG. 5.

Plate 112 is rigidly secured to cross braces 210 and 212 directly over plungers 72 of elevator 70 with its flat undersurface 278 positioned so that a tray 22 loaded with eggs can pass freely therebeneath. Plate 112 has thirty-six circular apertures 280 (FIGS. 1 and 2) which are disposed in a 6 by 6 pattern matching that of the egg compartment layout of tray 22 and axially aligned with the thirty-six lift plungers 72. The diameter of each aperture 280 at the upper surface 274 of plate 112 is less than the maximum transverse diameter of an egg 20, preferably being about 1.125 inches in diameter for "large" size eggs, so that when such eggs are inserted axially large end first into apertures 280, they will project about ¼ inch above surface 274 and hence above the path of travel of the cutting edge of knife 268.

It has been found that by following this dimensional relationship the knife will slice off only the "cap" piece 282 (FIG. 5) from the large end of the egg, thereby usually removing just eggshell material without touching the allantoic membrane 284. This membrane will usually have receded from the top of the egg by a distance slightly greater than ¼ inch, leaving an empty air sac in the egg, by the time the eggs have been incubated and processed as set forth previously and reach the point in the virus vaccine production cycle when they are ready to be opened for harvesting. If an occasional membrane 284 is torn by knife 266 in slicing off the top of the egg, this is not critical. Nevertheless it is preferred that this tearing of the membrane not be done by the knife since it cannot be relied upon, and also because the cutting plane would have to be lowered so that the knife would cut through a zone of the egg containing the liquid or embryo, and the resulting spatter would be a serious problem. When the top of the egg is cut off in the above manner, a one inch diameter horizontal opening is provided in the top of the egg, and this has been found to be adequate for efficient harvesting of the viral products from the egg.

Preferably, plate openings 280 have a frusto-conical side wall 286 (FIG. 5) tapered at about 45 degrees from the axis of the hole with a circular lower edge 288 in undersurface 278 which is larger in diameter than the maximum transverse diameter of egg 20 so that the egg is cammed into centered relation in the opening should it be tilted on plunger 72. The tapered entrance also eliminates any sharp edges contacting the egg and hence reduces cracking and breakage of the eggs as they are inserted into registry with the apertured plate 112.

Figure 1:
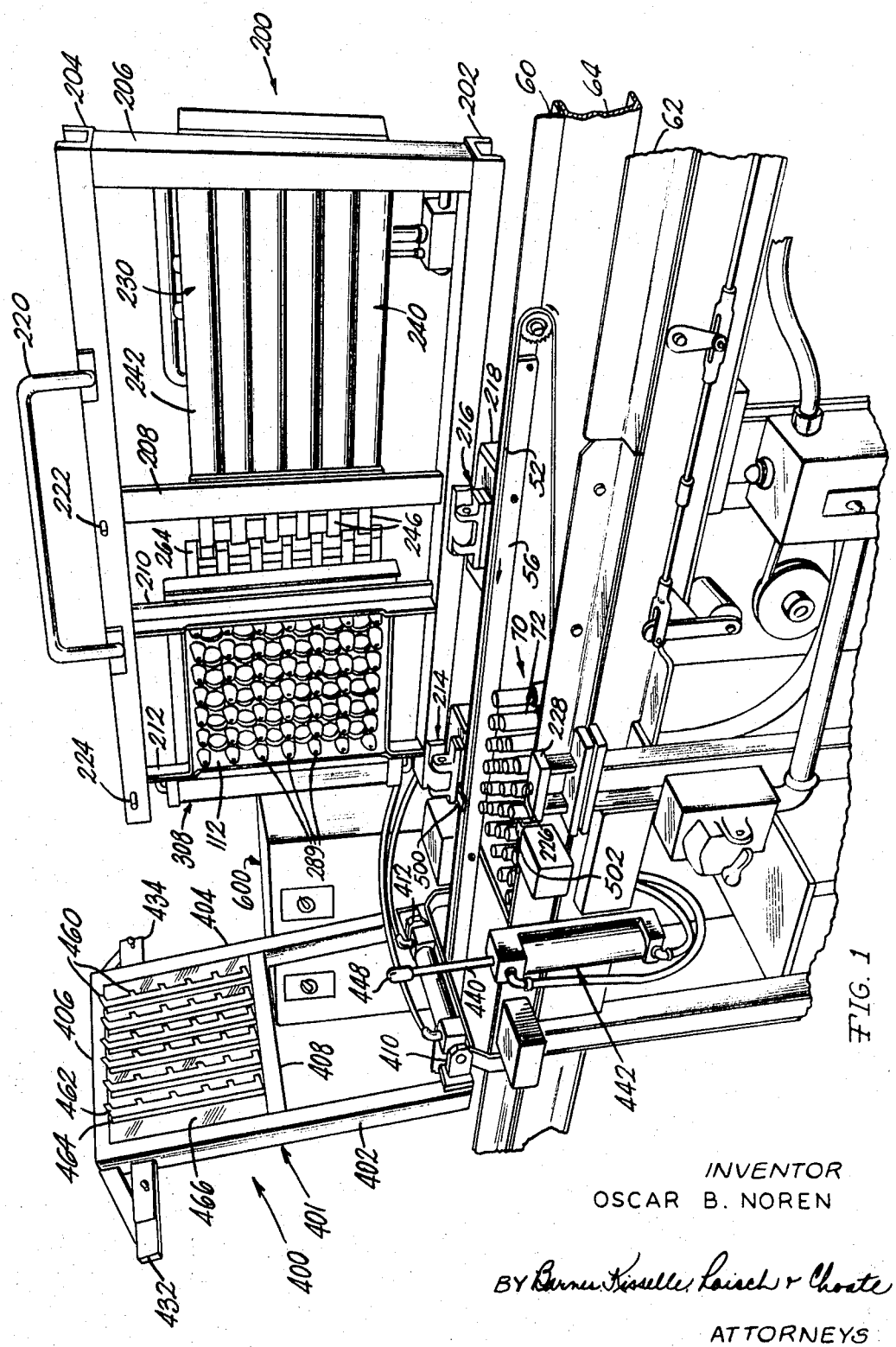
FIG. 1 is a fragmentary perspective view of a machine constructed in accordance with the present invention for cutting open hens' eggs and then rupturing the allantoic membrane, with the cutting and membrane tearing mechanisms of the machine shown pivoted to their upright inoperative positions.

To further guide entry of eggs 20 into registry with apertures 280 of plate 112, forty-nine frusto-conically shaped Teflon cleats 289 (FIG. 8) are secured to plate 112 in an array as best seen in FIG. 1 to project downwardly from the underside 278 of the plate a distance of approximately one inch. Four cleats 189 border each aperture 280 at 90 degree intervals, the large diameter upper ends of the cleats being disposed tangentially to the lower margin 288 of the plate aperture. Cleats 289 thus serve as conical extensions of the plate hole surfaces 286 and assist in camming the upper ends of eggs 20 into centered relation to the aperture as the eggs are raised into engagement with plate 112.

Knives 268 are propelled by a pneumatic driving system including air cylinders 242 each of which is supplied with compressed air from a suitable source (not shown). As shown semi-schematically in FIG. 2 air cylinder 242 of unit 230 has its driving chamber (to the left of piston 244) connected to an air line 290, it being understood that similar lines are connected in parallel to units 232–240. Line 290 is connected to the source of compressed air via a line 292 controlled by a conventional pilot operated three-way valve 294. When valve 294 is actuated to the "supply" position thereof shown in FIG. 2, it connects line 290 with line 292 and compressed air is thus supplied to the driving chamber of cylinders 242 to thereby rapidly drive the pistons to the right end of the cylinders to effect the cutting stroke of knives 268. When valve 294 is actuated to its "exhaust" position, it shuts off line 292 and connects line 290 with an exhaust line 296 to vent air from the driving chambers as the pistons are being driven back toward their retracted position. Units 230–240 preferably are pneumatically propelled on the retraction as well as driving strokes, the return driving air being supplied from the source of compressed air by a line 298 which is connected by another conventional pilot actuated three-way valve 300 to a line 302 connected to the return chambers of air cylinders 242. During the driving stroke of the piston 244, the return chamber is connected via line 302 and valve 300 to an exhaust line 304 to vent the air ahead of piston 244 from the return chamber. When the piston 244 has completed a driving stroke, valves 294 and 300 are simultaneously actuated to connect line 290 to 296 and line 298 to line 302 to thereby supply return air to the return chamber and vent the driving chamber, thereby effecting positive return of pistons 244 to the retracted position shown in FIG. 2.

Preferably units 230–240 are designed to propel knives 268 with a minimum velocity of about 10 ft./second along the associated row of six in-line openings 280 of plate 112 to effect a relatively sharp and clean successive cut-off of the tops 282 of the eggs. The knives are preferably operated at a speed of 15 to 25 feet per second, and when operated at this speed the severed caps 282 are thrown upwardly as illustrated in FIG. 5 against deflector 276 and then lodge loosely in the space between the deflector and the upper surface 269 of knife 268, the forward edge 273 of block 250 and the vertical portion 277 of deflector 276 forming a back stop for catching the severed fragments of the egg. Also, the two guide bars flanking each knife 268 prevent the several eggshell debris from being scattered to the side as the same is cut off from the egg. The severed debris is thus caught, collected and carried with the knife as the same travels to the end of its cutting stroke, indicated by the dotted line position of the cutting edge at 306 in FIG. 2.

When travel of knives 268 is abruptly halted at the end of their cutting stroke, the momentum of the severed debris causes it to be thrown forward out of the knife scoop in the direction of knife travel into a refuse collecting manifold 308 secured to the rear edge of plate 112 (FIGS. 2, 4, 7 and 8). Manifold 308 comprises a square tube closed at its ends by walls 310 and 312 (FIG. 7) and disposed with its front wall 314 perpendicular to the path of travel of knives 268. Wall 314 has an inlet comprising six apertures 316 individually aligned with knives 268 through which the severed debris is thrown from the knives, or, alternatively, one large opening may be provided in wall 314 for this purpose. Manifold 308 is equipped with a hood 318 (FIGS. 2, 4, 7 and 8) which has a generally horizontal wall 319 (FIG. 4) flush with the upper surface of manifold 308 which projects over the adjacent ends of bars 252–264, and a pair of end flaps 320, to prevent scattering of the debris should the same bounce back or not be thrown straight from the knives at the end of their cutting stroke.

A vacuum hose 322 is connected at one end to the top wall of manifold 308 and its other end is connected to a source of suction so that air is continuously drawn into the inlets 316. Hence eggshell fragments thrown into the manifold are entrained in this airstream and are carried via hose 322 to a disposal area. Removal of the debris is further facilitated by connecting exhaust lines 296 and 304 from the pneumatic driving units 230–240 via a pair of lines 324 and 326 (FIG. 2) leading through end plates 310 and 312 so that some of the exhaust air from both the driving and return strokes of units 230–240 is diverted into each end of manifold 308 to thereby produce twin air blasts directed from the opposite ends of the manifold toward the inlet of hose 322.

Membrane tearing mechanism

Referring to FIGS. 1, 8, 9 and 10, the machine of the present invention also includes a membrane tearing mechanism 400 which, after the eggs have been decapitated by cutting mechanism 200, is operable to penetrate the exposed upper surface of the allantoic membrane 284 and then tear an access opening therein to thereby facilitate subsequent harvesting of the liquid-entrained virus from the egg. Mechanism 400 includes an array of thirty-six piercing fingers 460 (FIGS. 1 and 8) carried on a pivotally mounted frame 401 comprising parallel side legs 402 and 404 (FIG. 1) connected by cross braces 406 and 408. Ears 410 and 412 fixed to the adjacent ends of legs 402 and 404 respectively are journaled by ball bearing assemblies 414 and 416 (FIG. 10) on bushings 418 and 420 mounted on the oppositely projecting ends 422 and 424 respectively of a plunger 426 of an air cylinder 428, plunger 426 thus serving as the pivot support for frame 401. Cylinder 428 is supported in fixed position on a U-frame 430 mounted on guides 60 and 62 so as to straddle the path of travel of tray 22.

Wing struts 432 and 434 are secured to legs 402 and 404 respectively near the free end of frame 401 and project laterally from the sides thereof as best seen in FIGS. 1 and 10. Struts 432 and 434 carry vertically adjustable stops 436 and 438 respectively which, when frame 401 is lowered to the horizontal piercing position thereof (shown in solid lines in FIG. 10 and in broken lines in FIG. 8), slidably seat on channels 202 and 204 of cutting mechanism 200 when the same is disposed in its horizontal operative position. The free end of frame 401 is raised and lowered by a vertically reciprocal plunger 440 of an air cylinder 442 supported by struts 444 and 446 on conveyor channel 62. Cylinder 442 is operated by compressed air and controlled by a conventional pilot operated valve (not shown) as described subsequently herein. A half-round knob 448 is secured to the upper end of plunger 440 which, on the upstroke of the plunger, strikes the underside of strut 432 to thereby raise the free end of frame 401 and thus pivot the frame to its retracted position shown in solid lines in FIG. 8 wherein fingers 460 clear the subjacent cutting mechanism. When the aforementioned control valve is actuated to vent cylinder 442, plunger 440 moves downwardly to thereby drop frame 401 to its horizontal operative position when buttons 436 and 438 slidably rest on channels 202 and 204, thus effecting a membrane piercing stroke of mechanism 400. Plunger 440 thereafter continues its downward travel until it bottoms in cylinder 442, knob 448 then being retracted clear of the strut 432 (FIG. 10).

Frame 401 is also horizontally shiftable a distance of about ½ inch. This motion is produced by actuating pilot operated valves which control a supply of compressed air to, and exhaust of air from, the double acting cylinder 428, via lines 450 and 452 respectively connected to the opposite ends of cylinder 428. When compressed air is admitted via line 450 to the left hand chamber of cylinder 428 (as viewed in FIG. 10), piston 454 of cylinder 428 is driven to the right hand limit of its travel, thereby moving plunger 426 and hence frame 401 to the extreme right hand position shown in FIG. 10, the air ahead of piston 426 being exhausted via line 452. To shift frame 401 to the left, the connections to the lines 450 and 452 are reversed, compressed air then being supplied by line 452 to the right hand chamber of cylinder 428 to drive piston 454 to the left until a bumper 456 fixed to end 422 of plunger 426 strikes end wall 458 of cylinder 428. The horizontal shifting movement of frame 401 to the right occurs while stops 436 and 438 are resting on channels 202 and 204, the buttons sliding transversely on the flat upper surface of the channels as the frame is shifted sideways. Shifting movement to the left occurs while frame 401 is elevated, strut 432 sliding on knob 448 during such movement.

The thirty-six fingers 460 of membrane tearing mechanism 400 are oriented to drop vertically one into the open end of each of the de-capped eggs 20, while the eggs are held clamped against the underside of plate 112 by elevator mechanism 70. Fingers 460 may take various forms but preferably the six fingers associated with each row of eggs aligned with a cutter comprise integral extensions of a sheet metal strip 462 which has a flange 464 bolted to a flat plate 466 secured to frame 401 between braces 406 and 408. Six such strips 462 are so secured in equally spaced parallel relation to plate 466 (FIG. 1), with the strips extending parallel to knife travel. As best seen in FIG. 9, each finger 460 is about ¼ inch wide parallel to knife travel, but only about 1/32 of an inch thick. The lower edge 468 of each finger 460 (FIG. 8) may be squared off as shown or otherwise shaped to have a smooth, blunt edge so that the yoke sac is not cut during penetration and tearing of the allantoic membrane 284 by finger 460. The penetrating stroke of fingers 460 is effected by causing plunger 440 to lower frame 401 from its raised position (solid lines, FIG. 8) to its horizontal position (broken lines, FIG. 8), the lower end of each finger 460 piercing the exposed membrane 280 of the subjacent decapitated egg as it penetrates about ¼ inch below the cut line of the egg on this stroke. The penetrating speed of fingers 460 should be fast enough so that membrane 284 is immediately ruptured with a minimum of stretch prior to rupturing to avoid building up an internal pressure within the egg. Excessive penetrating speed should also be avoided since this is likely to cause rupturing of the yoke sac rather than displacement of the same out of the path of finger 460. Penetrating speeds on the order of 1 to 3 feet per second have been found satisfactory. Finger 460 enters membrane 284 at a point offset horizontally about ¼ inch from the center of the egg 20, as shown in the broken line position of the finger 460 in FIG. 9, due to frame 401 being disposed to its extreme left hand position during the penetrating stroke.

After fingers 460 have thus penetrated the membrane, cylinder 428 is operated to shift frame 401 laterally to the extreme right hand position thereof shown in FIG. 10, thereby moving the entire array of thirty-six fingers 460 sideways to the position shown in solid lines in FIG. 9. This causes each finger 460 to tear a generally rectangular opening 470 in the top of the associated membrane 284, thereby exposing the liquid therebelow contained within the membrane sack. Cylinder 442 is then operated to drive plunger 440 on its upstroke to pivot frame 401 to its raised position, thereby withdrawing fingers 460 out of the eggs to their retracted position. Cylinder 428 is then operated to shift frame 401 horizontally to return it to its initial position where it is held poised for another penetrating stroke by plunger 440.

Egg tray positioning mechanism

The mechanism for fixturing the eggs at the work station includes a pair of substantially identical stop mechanisms as disclosed in detail in my copending application Ser. No. 605,632, filed Dec. 29, 1966 entitled "Machine For Injecting Influenza Seed Virus Into Eggs or the Like", the same not forming part of the present invention and therefore not shown or described in detail herein. Briefly, the stop mechanisms each include a solenoid and spring actuated finger 500 (FIGS. 1 and 8) which pivots between a tray blocking position intersecting the path of travel of fingers 40a–40f along the side of tray 22 and a tray release position wherein finger 500 is moved clear of the path of travel of these fingers. The two fingers 500 are disposed one adjacent each of the guides 60 and 62 and operate simultaneously to intersect the paths of travel of the lead fingers 40a on both sides of tray 22. When fingers 40a strike stop fingers 500, travel of tray 22 is halted, and thereafter the frictional force exerted by chain runs 52 and 54 on the smooth underside of tray 22 urges it against fingers 500 to thereby frictionally fixture tray 22 in a properly oriented position wherein the egg compartments of the tray are vertically aligned above plunger mechanisms 72 and vertically beneath apertures 280 of plate 112.

Cycle control mechanism

The mechanism for sensing the position of tray 22 and initiating the egg-cutoff and membrane-tear cycle of the machine includes a sensing mechanism similar to that disclosed in my aforementioned copending application. A sensing finger 502 is located a predetermined distance in advance of stops 500 relative to the direction of travel of tray 22 (FIGS. 1 and 8). Finger 502 is pivotally mounted and yieldably biased into the path of travel of side fingers 40a–40f of the tray and is adapted to be pivoted by fingers 40a–40f from a horizontal position as shown in FIG. 8 upwardly and outwardly to permit fingers 40a–40f to move past finger 502. When finger 502 is pivoted from its horizontal position, it actuates a switch connected to a conventional stepping relay (not shown) which is operable to control the solenoids of the stop mechanisms and the timing motor 602 of the cycle sequence control mechanism 600 described in more detail hereinafter. The stepping relay has a seven index cycle and is suitably connected to the sensing mechanism so that each time finger 502 drops in behind one of the side fingers 40a–40f, the relay indexes once. The output circuit of the stepping relay is connected to the stop mechanisms such that the fifth time the relay is so actuated (when finger 502 drops behind finger 40e) the relay indexes to its fifth position and thereby produces a first output signal which causes stop fingers 500 to drop from tray release to tray blocking position when fingers 500 are spaced ahead of lead fingers 40a by about the distance between an adjacent pair of fingers 40a–40f. When sensing finger 502 drops behind the sixth side finger 40f, the stepping relay indexes a sixth time to produce a second output signal which energizes motor 602 of cycle control mechanism 600 simultaneously with tray 22 being stopped by fingers 500.

Figure 11:
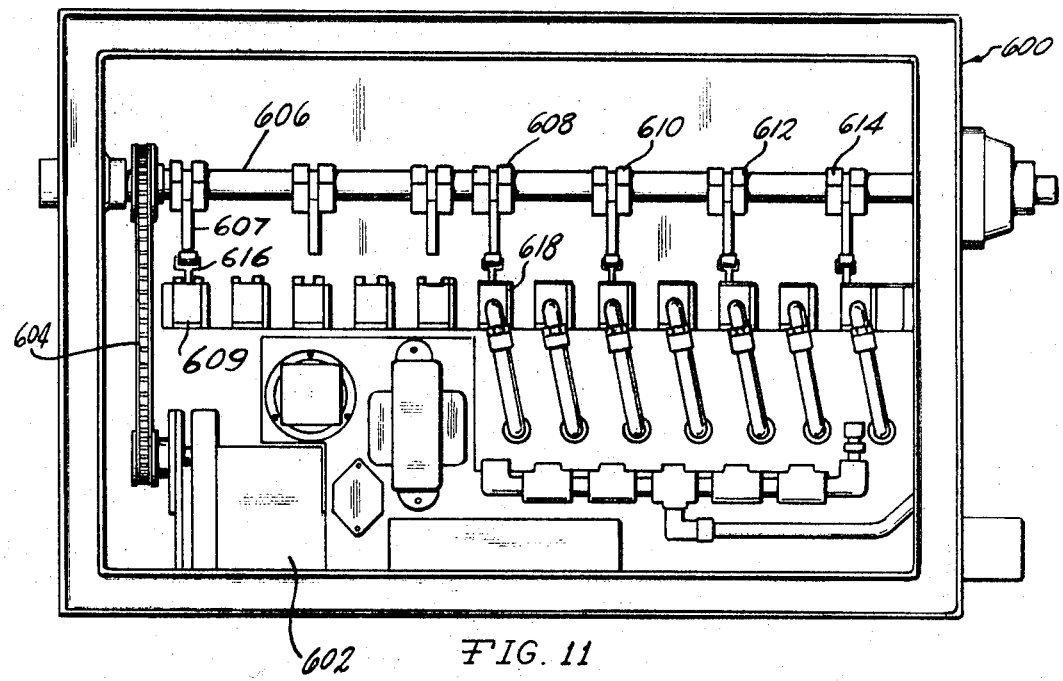
FIG. 11 is a front elevational view of a control mechanism for controlling the cycle of operations of the machine.
Figure 12:
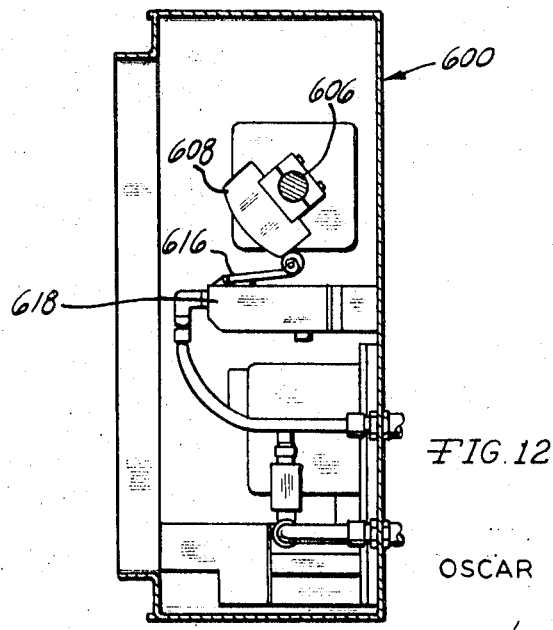
FIG. 12 is a vertical section through the control mechanism of FIG. 11.

Timing motor 602 of cycle control mechanism 600 (FIGS. 1, 11 and 12) is a conventional magnetic brake gear motor and is operably connected to the aforementioned stepping relay to be energized by the second output signal thereof. Timing motor 602 has its output shaft connected by a timing belt 604 to a camshaft 606 to rotate the camshaft through one complete revolution upon being energized by the stepping relay. Shaft 606 carries a plurality of cams including cams 607, 608, 610, 612 and 614 (FIG. 11). Cam 607 is adapted to actuate an associated cam roller follower arm 616 of a holding-in switch 609 which is connected in the energizing circuit of motor 602 and which closes as soon as motor 602 initiates rotation of shaft 606 to thereby maintain motor 602 running. The cams 608, 610, 612 and 614 are oriented in different angular positions on camshaft 606 to individually actuate, via an associated follower 616, an associated pilot valve 618 which in turn supplies control air to the pilot operated three-way valves of the machine system to effect a cycle of operations as described below in the summary of the operation of the machine of the present invention.

Operation

Whenever a tray 22 full of eggs 20 has entered the work station of the machine and is frictionally fixtured with its fingers 40a against stops 500, sensor 502 causes the stepping relay to energize motor 602 to thereby initiate rotation of camshaft 606. Cam 607 immediately actuates switch 609 to maintain motor 602 energized for one complete revolution of shaft 606. Rotation of camshaft 606 causes cam 608 to actuate valve 618 to pneumatically operate a three-way pilot operated valve (not shown) which controls air cylinder 132 to drive the egg elevator mechanism 70 on its upstroke wherein plungers 72 lift the eggs from tray 22 and insert them large end up into registry with the associated apertures 280 of plate 112. Then cam 610 actuates an associated pilot valve which pneumatically actuates valves 294 and 300 to their positions shown in FIG. 2 to thereby supply driving air to cutter units 230–240, thereby causing knives 268 to be driven on their cutting stroke to decapitate the eggs, the severed debris being thrown into manifold 308 for vacuum removal. Further rotation of cam 610 deactuates its associated pilot valve, thereby returning valves 294 and 304 to their opposite condition wherein return air is supplied to units 230–240 to return knives 268 to their retracted position shown in FIG. 2.

Cam 612 then actuates its associated pilot valve to operate another three-way pilot operated valve (not shown) suitably connected to vent air from cylinder 442, thereby dropping frame 401 so that the fingers 460 pierce the exposed allantoic membranes 284 of the associated decapitated eggs. Cam 614 then actuates its associated pilot valve to supply air to another three-way pilot operated valve (not shown) which is suitably connected to cylinder 428 to shift frame 401 and hence fingers 460 horizontally, this sidewise movement of each finger 460 tearing the membrane to form the access opening 470 therein (FIG. 9). Cam 612 then actuates its valve to supply air to cylinder 442 to drive plunger 440 upwardly so that it pivots frame 401 upwardly to its retracted position shown in solid lines in FIG. 8, thereby lifting fingers 460 out of the eggs to a position spaced above cutter mechanism 200. Cam 614 then reverses the air connections to cylinder 428 to shift frame 401 horizontally back to its initial position (wherein bumper 456 abuts end 458 of cylinder 428) so that the piercing fingers 460 are once more poised ready to be dropped in the next egg processing cycle.

Cam 608 then actuates its pilot valve to cut off the air supply to cylinder 132 and to exhaust the air therein, causing elevator mechanism 70 to lower plungers 72 to the bottom of their vertical stroke (FIG. 3), plungers 72 lowering the cutoff eggs back into tray 22 as the plungers are withdrawn from tray 22. The switch 609 actuated by cam 607 is also connected to the aforementioned stepping relay so that when cam 607 has almost completed one revolution it deactuates its switch 609, thereby causing the stepping relay to index to its seventh or zero position, thereby resetting the relay and causing the relay to produce a third output signal which retracts stop fingers 500 during the descent of plungers 72. Deactuation of switch 609 also de-energizes 602 as it completes one revolution. As soon as the upper ends of lifters 98 have lowered the eggs into the egg compartments and are disengaged from the eggs, tray 22 is free from restraint so that the continuously running chains 52 and 54 thereupon frictionally propel tray 22 forward out of the machine to a suitable harvest area (not shown).

I claim:

1. Apparatus for preparing eggs for removal of liquid therefrom including in combination locating means supported in a fixed position and having an aperture therein disposed with its axis generally vertical and adapted to receive an egg upright therein such that the upper end of said egg projects upwardly from an upper side of said locating means, means for supporting said egg upright for travel generally axially of said aperture between a retracted position wherein said egg is spaced below the lower side of said locating means and a raised cutoff position wherein said egg is held against said locating means with said upper end thereof projecting upwardly through said aperture, a knife movable along a path adjacent said upper side of said locating means transverse to the axis of said aperture, means for moving said knife on a cutting stroke to slice off said upper end of said egg projecting above said upper side of said locating means and for moving said knife to its initial position, and means synchronizing the operation of said knife moving means and said egg supporting means such that said egg supporting means moves said egg from said retracted position to the cutoff position, then said knife moves through its cutting stroke and is then returned to its initial position, and then said egg supporting means retracts the cut open egg clear of said locating means.

2. Apparatus for preparing eggs for removal of liquid therefrom including in combination locating means supported in a fixed position and having an aperture therein disposed with its axis generally vertical and adapted to receive an egg upright therein such that the upper end of said egg projects upwardly from an upper side of said locating means, means for supporting said egg upright for travel generally axially of said aperture between a retracted position wherein said egg is spaced below the lower side of said locating means and a raised cutoff position wherein said egg is held against said locating means with said upper end thereof projecting upwardly through said aperture, a knife movable along a path adjacent said upper side of said locating means transverse to the axis of said aperture, means for moving said knife on a cutting stroke to slice off said upper end of said egg projecting above said upper side of said locating means and for moving said knife to its initial position, said egg supporting means comprising a lifter having one end thereof adapted to engage the lower end of said egg opposite said upper end thereof, and drive means for supporting and moving said lifter including a member reciprocable parallel to the axis of said aperture, means forming a lost motion connection between said lifter and said member and resilient means interposed between said lifter and said member yieldably urging said lifter toward said aperture, said member being movable toward said aperture after movement of said lifter is halted by engagement of said egg with said locating means.

3. Apparatus as set forth in claim 2 further including a tray with a compartment therein open at the top thereof and having bottom wall means adapted to support said egg upright thereon with said upper end uppermost, said bottom wall means having an opening therein smaller than the maximum transverse dimension of said egg, and means for supporting said tray at a work station spaced below said locating means with said compartment axially aligned with said aperture, said egg supporting means comprising a lifter adapted to engage the lower end of said egg opposite said upper end thereof while said egg is seated on said bottom wall means, said lifter being dimensioned to pass upwardly through said opening in said wall means to lift said egg axially upwardly out of said compartment to said cutoff position in registry with said aperture, said lifter being retractable through said opening in said bottom wall means to deposit the egg in said compartment after said upper end has been cut off.

4. Apparatus as set forth in claim 3 wherein said means for supporting said tray comprises a conveyor having a pair of spaced parallel runs frictionally and slidably engagable with the underside of said tray along opposite side edges thereof for propelling said tray to said work station position below said locating means, stop means engageable with said tray to block travel of said tray on said conveyor when said tray reaches said work station position, and means for causing said stop means to release said tray after said lifter has been inserted through said egg compartment of said tray whereby retraction of said lifter through said compartment is effective to release said tray for movement on the conveyor.

5. Apparatus as set forth in claim 4 wherein said locating means has a plurality of said apertures arranged in a row parallel to the direction of travel of said knife, said conveyor being oriented to propel said tray at said work station parallel to the direction of travel of said knife, and wherein said tray has a plurality of said compartments, one for each of said apertures, adapted to individually receive an egg upright therein, said compartments being arranged in a row extending in the direction of travel of said tray, said compartments being arranged in individual axial alignment with said apertures when said tray is fixtured by said stop means at the work station, said tray having a plurality of projections one adjacent each of said compartments, a sensing finger positioned for actuation by said tray projections as said tray is propelled into the work station by said conveyor, and means operably connected to said sensing finger to actuate said stop means in response to all of said tray projections except the trailing one thereof successively actuating said sensing finger and to initiate movement of said lifter on its upstroke in response to the trailing one of said tray projections actuating said sensing finger.

6. Apparatus for preparing eggs for removal of liquid therefrom including in combination locating means supported in a fixed position and having an aperture therein disposed with its axis generally vertical and adapted to receive an egg upright therein such that the upper end of said egg projects upwardly from an upper side of said locating means, means for supporting said egg upright for travel generally axially of said aperture between a retracted position wherein said egg is spaced below the lower side of said locating means and a raised cutoff position wherein said egg is held against said locating means with said upper end thereof projecting upwardly through said aperture, a knife movable along a path adjacent said upper side of said locating means transverse to the axis of said aperture, and means for moving said knife on a cutting stroke to slice off said upper end of said egg projecting above said upper side of said locating means and for moving said knife to its initial position, said locating means having a plurality of guides secured to said lower side thereof and extending downwardly therefrom, said guides each comprising an inverted generally conically shaped member and being arranged at equal angular intervals relative to one another around said aperture, the surface of each of said guides facing the axis of said aperture being inclined downwardly and outwardly from said axis of said aperture whereby said surfaces of said guides guide an egg being raised toward cutoff position into centered relation to said aperture.

7. Apparatus for preparing eggs for removal of liquid therefrom including in combination locating means supported in a fixed position and having an aperture therein disposed with its axis generally vertical and adapted to receive an egg upright therein such that the upper end of said egg projects upwardly from an upper side of said locating means, means for supporting said egg upright for travel generally axially of said aperture between a retracted position wherein said egg is spaced below the lower side of said locating means and a raised cutoff position wherein said egg is held against said locating means with said upper end thereof projecting upwardly through said aperture, a knife movable along a path adjacent said upper side of said locating means transverse to the axis of said aperture, means for moving said knife on a cutting stroke to slice off said upper end of said egg projecting above said upper side of said locating means and for moving said knife to its initial position, and a receptacle disposed adjacent the end of the path of travel of said knife on said cutting stroke thereof and having an inlet facing said knife and aligned with the path of travel thereof, said knife moving means being operable to halt travel of said knife abruptly at the end of said cutting stroke of said knife whereby material severed from said egg by said knife and loosely carried thereon is thrown from said knife through said inlet into said receptacle as travel of the knife is halted at the end of said cutting stroke thereof.

8. Apparatus as set forth in claim 7 wherein said knife has a deflector member mounted thereon for travel therewith, said deflector extending parallel to the path of travel of said knife spaced above the cutting edge thereof to define a scoop-like area therebetween for catching material severed from said egg by said knife during travel of the knife on said cutting stroke.

9. Apparatus as set forth in claim 8 wherein said knife moving means is operable to propel said knife on said cutting stroke thereof at a minimum velocity of approximately 10 feet per second across said aperture.

10. Apparatus as set forth in claim 8 wherein said knife has a flat bottom face disposed perpendicular to the axis of said aperture and a cutting face at the leading end of said knife inclined rearwardly and upwardly from said bottom face relative to the direction of travel of said knife on a cutting stroke.

11. Apparatus as set forth in claim 10 wherein said cutting face of said knife comprises two surfaces intersecting at a central point aligned to intersect the axis of said aperture during travel of the knife thereacross, said surfaces tapering rearwardly and outwardly from said central point to the opposite sides of said knife.

12. Apparatus as set forth in claim 7 wherein said receptacle comprises a hollow tubular member disposed with its axis perpendicular to the path of travel of said knife and being substantially imperforate to outside atmosphere except for said inlet, said tubular member having an exhaust port communicating with the interior of said compartment adjacent said inlet, and further including vacuum removal means comprising a conduit connected at one end to said port and at the other end to a source of subatmospheric pressure for causing an air stream to enter said receptacle via said inlet and to leave said receptacle via said port so that material thrown into said receptacle from said knife is entrained in said air stream and removed via said conduit.

13. Apparatus as set forth in claim 12 wherein said knife moving means comprises an air cylinder mechanism including a piston reciprocable in said air cylinder and having a plunger connected to said knife, and further including means connecting said cylinder to said receptacle such that air exhausted from said cylinder ahead of said piston is directed into said receptacle in converging streams tending to sweep said material toward said exhaust port.

14. Apparatus for preparing eggs for removal of liquid therefrom including in combination locating means supported in a fixed position and having an aperture therein disposed with its axis generally vertical and adapted to receive an egg upright therein such that the upper end of said egg projects upwardly from an upper side of said locating means, means for supporting said egg upright for travel generally axially of said aperture between a retracted position wherein said egg is spaced below the lower side of said locating means and a raised cutoff position wherein said egg is held against said locating means with said upper end thereof projecting upwardly through said aperture, a knife movable along a path adjacent said upper side of said locating means transverse to the axis of said aperture, means for moving said knife on a cutting stroke to slice off said upper end of said egg projecting above said upper side of said locating means and for moving said knife to its initial position, a membrane tearing mechanism comprising a penetrating finger adapted to puncture the allantoic membrane of the egg exposed by decapitation of the egg by said knife, and means for movably supporting said penetrating finger adjacent said upper side of said locating means for movement from a retracted position above the path of travel of said knife and a membrane penetrating position wherein the penetrating end of said finger is disposed below the path of travel of said knife, said finger supporting means being movable horizontally while said finger is in said penetrating position to effect tearing of said membrane to thereby form an access opening therein.

15. Apparatus as set forth in claim 14 wherein said penetrating finger comprises a rigid member having its longitudinal axis disposed parallel to the axis of said aperture when said finger is in said penetrating position, said finger having a width dimension measured perpendicular to the direction of horizontal tearing movement thereof of about ¼ of an inch and a thickness dimension perpendicular to said width dimension of about $\frac{1}{32}$ of an inch.

16. Apparatus as set forth in claim 1 wherein said knife moving means is operable to propel said knife on said cutting stroke thereof at a minimum velocity of approximately 10 feet per second across said aperture.

References Cited

UNITED STATES PATENTS

| | | | |
|---|---|---|---|
| 499,080 | 6/1893 | Anderson | 146—2 |
| 2,465,176 | 3/1949 | Serbu | 146—2 |
| 2,524,844 | 10/1950 | Smith | 146—2 |
| 3,207,198 | 9/1965 | Beeson et al. | 146—221 |
| 3,307,600 | 3/1967 | Fuge | 146—221 |

W. GRAYDON ABERCROMBIE, Primary Examiner

U.S. Cl. X.R.

195—127